May 23, 1933.  A. S. DICKERSON  1,909,931
MOTOR WARMED WINDSHIELD FOR VEHICLES
Filed July 21, 1930   3 Sheets-Sheet 1

Inventor
ARTHUR S. DICKERSON
By Frank D. Gray
Attorney

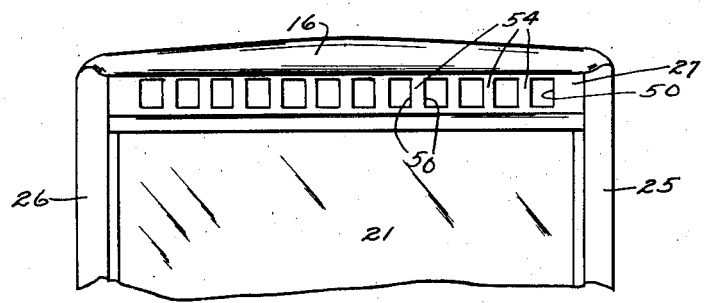
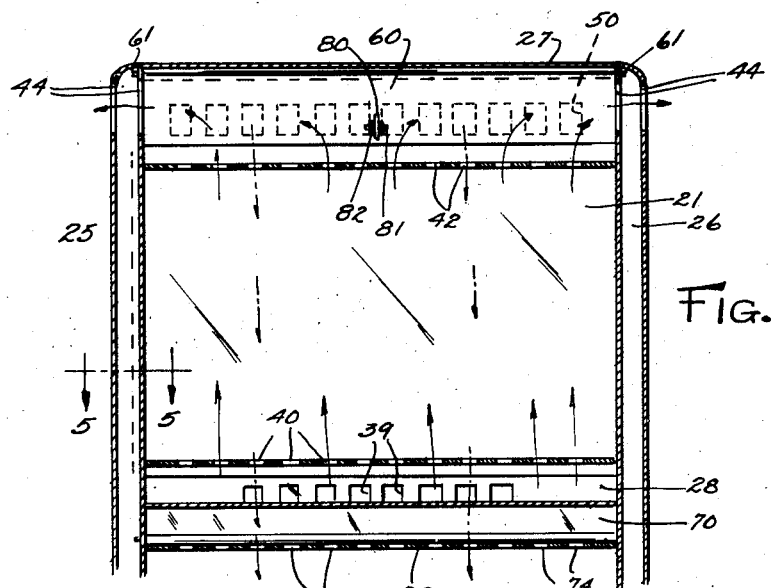
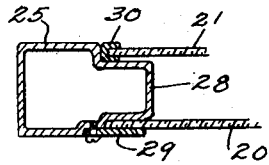

May 23, 1933.  A. S. DICKERSON  1,909,931
MOTOR WARMED WINDSHIELD FOR VEHICLES
Filed July 21, 1930   3 Sheets-Sheet 3

Inventor
ARTHUR S. DICKERSON
By Frank D. Gray
Attorney

Patented May 23, 1933

1,909,931

UNITED STATES PATENT OFFICE

ARTHUR S. DICKERSON, OF CHAGRIN FALLS, OHIO

MOTOR WARMED WINDSHIELD FOR VEHICLES

Application filed July 21, 1930. Serial No. 469,297.

This invention relates to useful improvements in motor warmed windshields for motor vehicles and especially to a combined motor warmed windshield and vehicle ventilator. The general object of this invention is the provision of an apparatus which will prevent the formation and collection of ice and moisture on the surfaces of the windshields of motor vehicles. A more specific object is the provision of a windshield warmer which will use the excess heat of the motor to prevent the collection of ice and moisture on the surfaces of vehicle windshields or windows.

A further object is the provision of an apparatus which will direct a current of air, previously heated by the motor, against the surfaces of the windshield in a manner which will insure clear vision to the driver and occupants of the vehicle.

Another object of this invention is to provide means whereby a current of air which has been heated by the motor is directed against the surfaces of the windshield and wherein a current of unheated air may be directed from the outside against the windshield and thence within the body of the vehicle as desired by the operator of the vehicle.

Another object is to provide means whereby the operator of a motor vehicle may readily control passage of heated air against the surface of the windshield or may, if desired, direct a current of unheated air against the windshield and thence into the vehicle.

Another object of this invention is the provision of a windshield warmer, for windshields having spaced panes of transparent material, wherein warmed air, from the motor may be directed between the panes or cold air from the outside the vehicle may be directed between the two panes and thence into the car as desired by the operator of the vehicle, and to provide means whereby such currents of air are at all times under the direct control of the driver and wherein such controls are conveniently located and may be readily changed to suit the varying atmospheric conditions.

Another object is the provision of an apparatus to accomplish the purposes heretofore set forth, which will be simple in form, easily manufactured and readily applied. Other objects of my invention will become apparent from the following description referring to a preferred embodiment illustrated in the drawings and its simple and novel characteristics will be set forth in the claims.

Referring to the drawings; Fig. 1 is a side elevation of an automobile having a preferred embodiment of my invention mounted thereon, certain parts being broken away, to illustrate the internal construction, the plane of vision being substantially longitudinally through the operator's position.

Fig 3 is a partial front elevation and illustrates the construction of the upper front panel.

Fig. 4 is a vertical section and is indicated by the lines 4—4 in Fig. 1.

Fig 5 is a horizontal section and is indicated by the lines 5—5 in Fig. 4.

Figure 6:
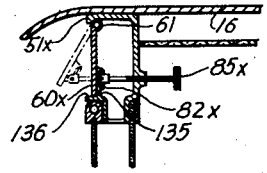
Fig. 6 is a detail vertical section of a modified form of swinging door and adjacent members.

Referring again to the drawings, I show an automobile having the usual motor housing 10 adapted to house a suitable motor 11, a cowl 12, a dash 14, an instrument board 15, a top 16 and a windshield generally shown at 17, such parts being generally diagrammatically shown and representative of the usual automobile, it is readily adapted to any type of motor driven vehicle.

In the embodiment illustrated in Figs. 1–5 inclusive, the windshield comprises a pair of spaced apart panes of glass, or other suitable transparent material, 20 and 21, the pane 20 being rigidly secured to suitable upright frame members 25 and 26 and crossframe members 27 and 28, the frame members 25 and 26 being joined together by the top and bottom crossframe members 27 and 28 respectively. Suitable retaining plates 29, bolted, or otherwise fastened to the frame secure the pane 20 in position. The pane 21, which, as shown, is the outermost pane is mounted in a rectangular frame 30 and is pivotally secured at its upper end, as at 31, to the upper frame member 27.

Figure 1:
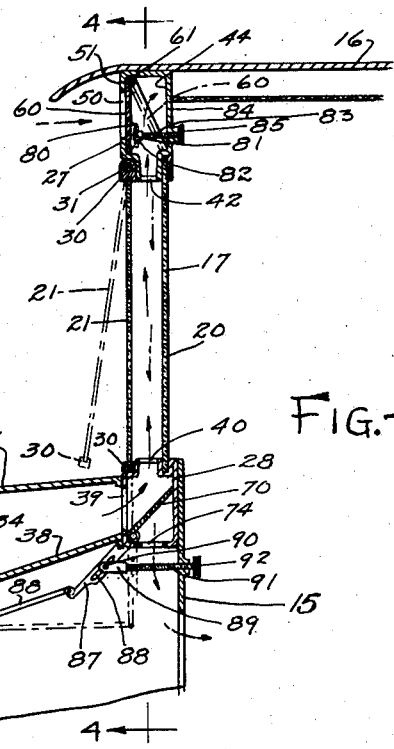
Figure 2:
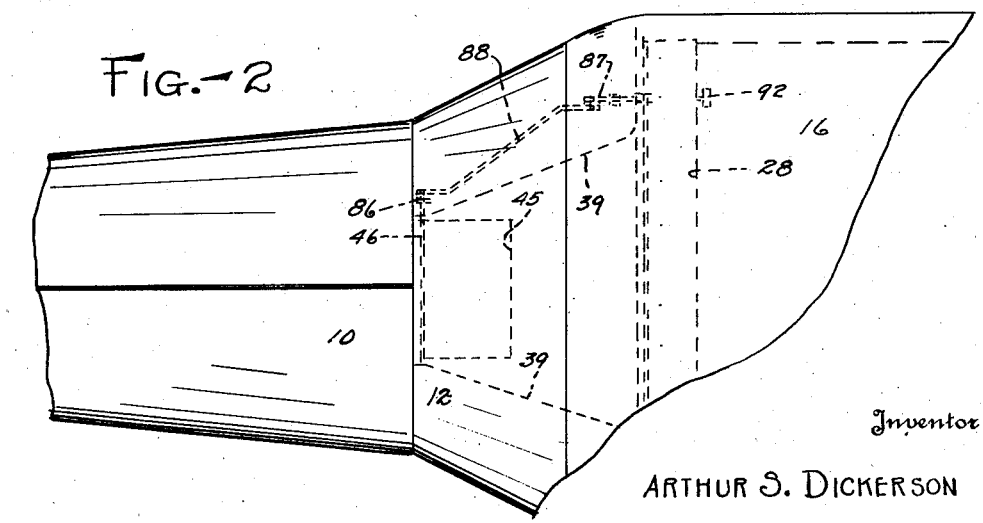
Fig. 2 is a plan looking from the top of Fig. 1.

Warm air, in this embodiment, is preferably forced between the two panes 20 and 21 of the windshield, as I find, that by so doing, ice is prevented from forming on the pane 21 and moisture is prevented from forming on the pane 20. To this end, openings 35 are cut in the upper portion of the dash member 14, and the lower portion 36 extends below such openings, as shown in Figs. 1 and 4. These openings 35 are substantially rectangular in shape, and there is sufficient metal between them to maintain rigidity for the dash structure. A conduit 34, formed by the top member 37 of the cowl 12 a bottom plate 38 and side plates 18, is adapted to conduct the heated air, which is forced through the openings 35 by the usual motor fan, through the cowl portions of the vehicle and through openings 39 into the hollow frame member 28.

The frame member 28 has in its upper face a plurality of openings 40 which permit the passage of air from the conduit 34 into the space between the two windshield members 20 and 21. The upper hollow frame member 27 has a plurality of openings 42 in its lower surface which conducts the air from the space between the two panes upwardly into the frame member 27, where suitable openings, such as shown at 44 in the side of the frame members 25 and 26 permit the discharge of the heated air from the vehicle.

It will be seen that the air pressure in the motor housing, caused by the forward movement of the vehicle, forces the warm air through the conduit 34, to the space between the windshield members and thence from the vehicle through the side openings 44. It will also be noted that forward movement of the vehicle tends to create a partial vacuum adjacent the openings 44 thereby aiding the exhaust of the air from between the two windshield members.

It is desirable to provide a simple means for controlling the passage of heated air to the space between the panes 20 and 21. I prefer to supply the forward end of the conduit or passageway 34 with a door 45 which is pivoted at 46 to permit it to be thrown from the position shown in full lines to the position shown in dotted lines in Fig. 1 where it closes the openings 35, thereby preventing the air from entering the passageway 34 and hence from circulating in the space between the windshield members.

It is desirable to provide means by which air from the outside of the vehicle may be introduced to the space within the body of the vehicle. Many different methods have been used to accomplish this, however I prefer to provide the outer face 51 of the top hollow frame member 27 with openings 50 which face towards the front of the vehicle and are at a point where there exists an increased air pressure, during the movement of the vehicle along the highway. I preferably provide a plurality of these openings, as is best illustrated in Fig. 3, there being a small bridge wall 54 between the openings, thereby retaining rigidity and strength of structure in the frame member and at the same time permitting a maximum area of total opening.

When it is desired to permit the outside air to enter the vehicle, a door 60, pivoted at 61 to the frame member, which normally lies in a position adjacent the front portion of the hollow frame member 27, as shown by the full lines in Fig. 1, is swung inwardly to the position indicated by the dotted lines in Fig. 1. It will be noted that when the door is in the latter position, it effectively stops the passage of air from between the two panes 20 and 21 to the openings 44. Hence the air currents, shown in the dotted lines in Fig. 1, which enter the openings 50, pass downwardly through the space between the two panes. To permit these currents of cool air to enter the car or vehicle, I provide the lower hollow frame member 28 with a door or valve 70 pivoted at 71 and adapted to be moved from the position shown in full lines, to the position shown in dotted lines, in Fig. 1, in which latter position the door will close the openings 39 and permit the air currents between the panes to pass downwardly through suitable openings 74 in the lower wall of the hollow frame member 28 and thence rearwardly into the body of the car.

When the device is used to warm the windshields, the doors 45, 60 and 70 are in the positions shown in the full lines in Fig. 1; the door 45 permits the passage of heated air from the motor housing 10 to the passageway 34; the door 70 closes the openings 74 and permits the air from the passageway to enter the space between the two windshield members; the door 60 closes the openings 50 in the frame member 27 and permits the air between the panes to be exhausted into the atmosphere through the openings 44.

When the device is used to ventilate the vehicle, the doors 45, 60 and 70 are in the position shown in the dotted lines in Fig. 1; the doors 45 and 70 close the openings 35 and 39 respectively, providing a double seal to prevent gas laden air from entering the body of the vehicle; the door 70 is in a position to permit air to pass from the outside of the vehicle downwardly between the two windshield members and thence through the openings 74 in the lower frame member 28 downwardly and rearwardly into the interior of the vehicle.

I prefer to operate the various doors from within the car. Therefore the door 60 is provided with a slotted lug 80 which coacts with a pin 81 carried by a fork 82, rotatably secured to the end of a pin 83 which is threaded into the inner face 84 of the frame member 27 and is provided with a knurled head 85, by means of which the door may be readily opened by the operator.

The doors 45 and 70 are rigidly secured to their pivot shafts 46 and 71. Rigidly secured to the shafts 46 and 71 are downwardly extending levers 86 and 87, respectively which are pivotally connected together by means of a link 88. The lever 87 is slotted as at 93 to carry a pin 89 retained in a fork 90, which is rotatably mounted on one end of a stud 91 which is threaded into the instrument board 15 of the vehicle and has a knurled head 92 by means of which it may be rotated to cause the opening and closing of the doors simultaneously.

In the modified door structure of Fig. 6, the door 60ˣ is made to swing outward on its hinge 61 by shortening the lip 51ˣ, lengthening the screw 85ˣ, and forming an inner shoulder 135 upon the plate 136, but retaining a form of fork 82ˣ.

Figure 7:
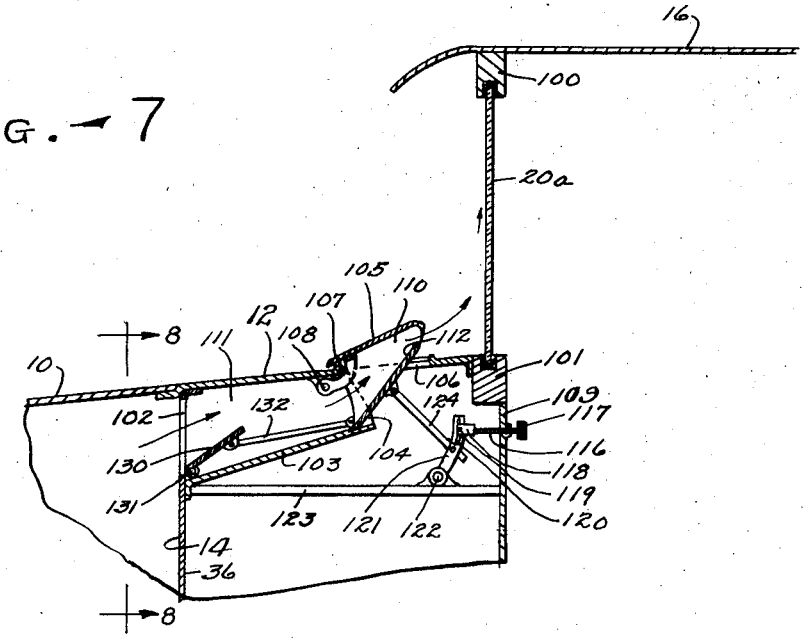
Fig. 7 is a longitudinal, vertically extending, section through an automobile, the plane of vision being substantially through the driver's position and illustrates a modified form of my device.
Figure 8:
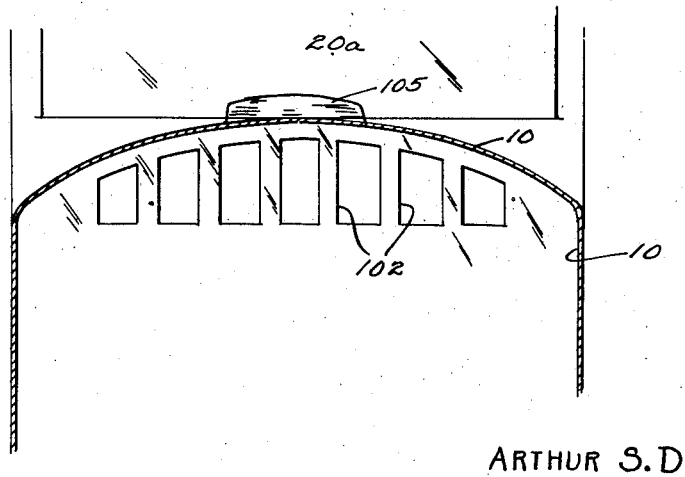
Fig. 8 is a horizontal section being indicated by the lines 8—8 in Fig. 7.

In Fig. 7 I show a modified form of windshield heater, in which I utilize a door 105 in the upper face of the cowl chamber 103, to force the air against the outer surface of the windshield 20ᵃ, which, in this instance is a single pane of transparent material, secured to frame members 100 and 101. The heated air from the motor passes through openings 102 in the dash 14 which are similar in all respects to the openings 35 heretofore described. The heated air then passes through a housing 103 which has an open end 104 into which projects a housing or door 105. The door or housing 105 is preferably adapted to close an opening 106 in the upper surface in the cowl 12a, and is supported by an arm 107 pivoted at 108. This door 105 is funnel shaped, to the end that, when it is opened its side members 110 will form a continuation of the side walls 111 of the passageway 103, the top or door portion 105 will form a continuation of the top of the passageway and the bottom 112 will form a continuation of the bottom of the passageway. The air currents therefore pass through the passageway 103 into the passageway formed by the door 105 which directs them against the outer surface of the windshield 20ᵃ.

When it is not desired to warm the windshield, the door 105 is closed by means of a bolt 116 threaded into the instrument board 109 and provided with a knurled head 117. A forked member 118 rotatably secured to the inner end of the bolt carries a pin 119 adapted to coact with a slot 120 in a lever 121 pivoted at 122 to a suitable frame member 123. A link 124 pivoted at one end to the lever 121 and at the other end to the door 105 joins the door 105 with its operating bolt.

As it is desirable to prevent the passage of gas-laden air from the motor housing to within the vehicle I provide a door 130, pivoted at 131, and joined by a suitable link 132 to the door 105. Hence when the door 105 is closed the link 132 will also cause the closing of the door 130.

Having set forth the principles of my invention and described and illustrated an embodiment thereof for practical use, what I claim and desire to secure by Letters Patent, is,—

1. In a motor vehicle having a motor, a motor housing, a windshield comprising spaced transparent panes, a windshield warmer comprising a conduit adapted to convey heated air from the motor housing rearwardly to the space between the panes, inlet and outlet valves for said conduit, a passageway adapted to permit the discharge of heated air upwardly from between the windshield members forwardly or laterally selectively and a valve adapted to close such passageway against communication in either of said directions, and means to control the valve.

2. In a motor vehicle the combination of a windshield comprising spaced transparent members, a conduit associated with the upper portion of the windshield having openings in different planes communicating with the space between said members, and with outside air, a valve adapted to close the openings in either plane selectively, a conduit at the lower end of said windshield members having openings therein some of them leading downwardly into the car and others leading forwardly from the conduit and a valve adapted to close the last named openings, selectively, a dash board having an apertured upper portion, a conduit leading from said apertures to the conduit at the lower end of the windshield, and manual actuating means for the valves mounted at the upper and lower conduits of the windshield, whereby opening both valves to permit communication between both the dash conduit and the said upper conduit forward openings, with the inner space of the windshield is free and open, while reversing both said valves will establish communication between the forward openings of the upper conduit with the interior of the vehicle through the windshield space and drive cool air downward through the windshield.

3. In combination with a motor vehicle, having a motor, a motor housing a windshield comprising parallel members, a conduit at the upper end of said members having an opening leading to the side of the vehicle and an opening directed forwardly to the front of the vehicle, a valve adapted to close either of said openings selectively, a conduit at the bottom of said windshield having openings leading into the motor housing and openings leading into the interior of the vehicle and a unitary valve adapted to close either of said openings.

4. In combination with a motor vehicle having a motor, a motor housing a windshield comprising spaced transparent members, a conduit adjacent the upper end of said members, communicating with the space between the members and having an opening to the side of the vehicle and an opening to the front of the vehicle, a valve adapted to close either of said openings selectively, a conduit adjacent the bottom of said windshield communicating with the space between the members and having openings leading into the motor housing and openings leading into the interior of the vehicle and a hinged valve mounted for swinging toward the housing openings and the openings toward the interior of the vehicle, and thereby adapted to close either of said openings selectively.

5. In combination with a motor vehicle having a motor, a motor housing, a windshield comprising a plurality of spaced panes of transparent material, a conduit in communication with the space between the panes at the upper end thereof and in communication with the outer air above and forward of the windshield and thereby adapted to convey air from outside the vehicle downwardly between the spaced panes, a second conduit having openings communicating with the interior of the vehicle, and with the motor housing, and a valve adapted to close said openings, selectively.

6. In combination with the windshield of a motor vehicle, a windshield warming device comprising a conduit leading rearwardly from the motor and adapted to carry heated air toward the lower portion of the windshield, a valve associated with the inlet end of said conduit, a valve associated with the outlet end thereof, and unitary means to control said valves simultaneously, a conduit having communication with said windshield and with the outlet end of the conduit leading from the motor, and adapted to carry air from the motor conduit upwardly, or from the windshield downwardly, and a valve to control the direction of flow of said air in said conduit.

7. In combination with the windshield of a motor vehicle, a motor housing, a double-pane windshield warming device, including a conduit adapted to convey heated air rearwardly from the motor housing, a conduit in communication with the outer end of the motor conduit and with the space between said panes, a valve adapted to control air flow between said windshield and conduit, and means associated with the upper end of said windshield for controlling the air through said space between said panes, and directing said air upwardly or downwardly, selectively.

8. In combination with a motor vehicle having a windshield comprising a plurality of spaced panes of transparent material, a conduit in communication with the space between the panes at the upper end thereof and in communication with the outer air above and forward of the windshield, and thereby adapted to convey air from outside the vehicle downwardly between the spaced panes into the interior of the vehicle.

In witness whereof, I have hereunto set my hand this 14th day of July, A. D. 1930.

ARTHUR S. DICKERSON.